Patented Apr. 18, 1944

2,346,930

UNITED STATES PATENT OFFICE 2,346,930

ROAD CONSTRUCTION

John H. Long, Marshallton, Del., assignor to Hercules Powder Company, Wilmington, Del., a corporation of Delaware No Drawing. Application December 24, 1942, Serial No. 470,117

6 Claims. (Cl. 94—22)

This invention relates to road or paving construction, and more particularly to road or paving construction which requires moisture adjustment of the base course prior to application of a bituminous binder material.

In road or paving construction it is necessary, when a bituminous binder is to be applied, to adjust the moisture content of the soil. The surface of the grade must be dry enough so that the bituminous binder material can effectively bond with the soil particles.

It frequently happens, in road or paving construction and the like that a rain occurs and renders the soil unsuitable for application of the binding material. This, of course, ties up valuable construction equipment, causes a lay-off of labor, disrupts the construction schedule and in all is very time consuming and expensive. In some instances, when the rain or precipitation is considerable and of long duration, it becomes necessary to re-grade the road or base because of holes and washouts. Furthermore, even when it is possible to protect portions of the grade with tarpaulins or other surface protection, if the precipitation is considerable, the water table of the sub-grade will rise, thereby making the soil unsuitable for further work. The method of restoring the soil to proper moisture content is by aeration of the soil with the atmosphere, which procedure is time consuming and has long constituted a dilemma in the construction art.

In the construction of roads or pavements in accordance with this invention the aforementioned difficulties are eliminated and construction can proceed immediately, even after a very heavy precipitation. This is of particular significance when a bituminous cut back is to be mixed with the soil as it is a well-known fact that soil must be reasonably dry before applying cut back asphalt in order to secure a good bond between the soil particles. It is in conjunction with the use of cut back asphalt as a binder that the present invention is more particularly concerned, however, other materials requiring a somewhat critical moisture content in the soil to secure good bond may also be advantageously employed in practicing the invention.

Now, in accordance with this invention there is provided a method for constructing roads and pavements which includes treating soil with a pine wood resin or soluble salt thereof and thereafter incorporating a bituminous binder material. Bituminous materials which are suitable for this purpose include asphalt, asphaltic oils and tars, including petroleum road oils.

By soil, a natural earthy material is meant which is high in sand content and is deficient in natural earthy binding material, which renders the soil unstable in its natural condition for construction purposes.

In practicing the invention pine wood resin or a mixture of said resin and rosin is applied to the soil in the form of an alkaline slurry or emulsion applied by means of a pressure distributor, so equipped as to insure uniform distribution, and so regulated that the required width to be treated can be covered without overlapping.

The pine wood resin or a mixture of said resin and rosin is preferably applied in two applications of one-fourth of a gallon each per square yard. This will deposit approximately 1.5 pounds of pine wood resin or a mixture of said resin and rosin per square yard from slurry or emulsion having approximately 3 pounds of solids per gallon. Regardless of the phase of applying the pine wood resin the amount of pine wood resin applied should be from about 1.5 pounds to about 3.0 pounds per square yard.

The bituminous binder material is applied at any time after the soil has been treated as described above and the soil has dried back from the aqueous content of the initial slurry or emulsion treatment. Any subsequent wetting of the soil, due to precipitation or the like will be ineffective due to the high run-off factor imparted to the treated soil by the pine wood resin or mixture of said resin and rosin. Furthermore, the deposition of pine wood resin or mixture thereof will depress any capillary rise action of sub-surface moisture which will tend to rise due to any increased elevation of the water table.

Another method for incorporating the pine wood resin in the soil includes harrowing the grade with either a tooth or disc harrow and applying about 3 pounds of pulverized pine wood resin per square yard for a 6-inch compacted depth, continuing the harrowing until uniform mixture and density is secured after which the soil is brought to the required cross-section and compacted. Immediately after the pine wood resin is incorporated in the soil the soil may be sprinkled with an alkaline solution to accelerate dispersion of the pine wood resin in the harrowing and compaction operations. The bituminous binder material is then applied when desired. Still another method for incorporating the pine wood resin in the soil is to incorporate the pine wood resin directly into windrows of the soil. These windrows are uniformly distributed and the bituminous binder material is mixed with the soil and the mixture is spread upon the subgrade and thereafter suitably compacted.

The application of bituminous material is carried out in the conventional manner for applying the specific type of material selected. These methods will not be further discussed as they are well standardized in the art.

The following examples prepared with a substantially petroleum hydrocarbon insoluble pine wood resin or a mixture of said resin and rosin will serve to illustrate the principles of the invention, although it will be understood that these examples are in no way intended to limit the scope of the invention.

EXAMPLE I

A soil 100% of which passed a #10 mesh sieve, comprising by weight, sand, 90.8%; silt, 3.8%; clay, 5.4%; and having an optimum moisture content of approximately 5.0%, was classified as a Public Roads Administration class A-3 soil. This soil was dried back to about 2½ to 3% moisture. To one batch of the soil was added 0.6% pine wood resin (equivalent to 3 lbs. per square yard for a 6-inch compacted depth) in the form of an alkaline slurry. To another batch of soil 5 lbs. of pine wood resin-rosin mixture emulsion (40% solids) was added. The emulsion of pine wood resin-rosin mixture was admixed uniformly into the soil. To a third batch no resinous material was added. These three batches of soil were each placed in a box 6 inches square and 4 inches deep. The soil was packed into the boxes by hand and pyramided at the top slightly to represent the crown of a roadway, the lower extremities of the crown being flush with the top of the box. Before the soil was placed into the box, moisture samples were taken from each batch. The boxes were then placed in a sink and water from a mechanical spray, representing "rain" was uniformly distributed over them. The two batches of soil containing resinous material shed the water readily, while the batch containing no resinous material did not shed the water allowing the water to penetrate to the bottom of the box. When it was apparent that the untreated soil was about saturated, the "rain" was stopped. A core was taken from the center of each box, all the way down to the bottom, and a moisture determination made on the samples. Results of this moisture determination and the ones taken before the "rain" are shown in Table I below:

TABLE I

*Precipitation test*

[Type soil A-3; optimum moisture 5.0%; density 105 lbs./cu. feet.]

| No. | Method of treatment | Moisture before "rain" | Moisture after "rain" |
|---|---|---|---|
| | | Per cent | Per cent |
| 1 | Untreated soil | 2.5 | 12.4 |
| 2 | Soil containing 3 lbs./sq. yd. pine wood resin slurry. | 2.8 | 3.1 |
| 3 | Soil containing 5 lbs./sq. yd. pine wood resin-rosin emulsion (40% solids). | 2.5 | 2.8 |

As shown by the above results, the batches 2 and 3 containing the treated soil picked up practically no moisture while the untreated soil as indicated by batch 1 became saturated. The moisture picked up by the treated soils was confined to the top 1/16 inch. Below this, it was apparently as dry as before it "rained."

EXAMPLE II

Another test was made to determine if, by spraying resinous material on a windrow of soil without mixing it in, this procedure would cause the soil to shed water. Two batches of soil, each containing 2.9% moisture, were placed in boxes and pyramided at the top in the shape of a windrow. The bottom of the windrow was flush with the top of the box. On one soil was sprayed 5 lbs. of pine wood resin-rosin emulsion (40% solids) per square yard. Within 5 minutes, the two specimens were exposed to "rain." The specimen sprayed with pine wood resin-rosin mixture shed water readily, while the untreated soil absorbed all the water. Moisture samples taken after the "rain," showed that the untreated soil had a moisture content of 10.6%, while the treated soil showed a moisture content of 5%.

EXAMPLE III

While Examples I and II clearly show the water repellent characteristics of the treated soil relative to surface water, the following example is directed primarily to show the depressing action the resinous material has on capillary rise of sub-surface water.

In this connection a laboratory method has been devised which gives an indication of the activity which may be expected of the soil in the field. It is verified by sufficient field experience to be used for making recommendations as to the amount of resinous material to be used in field construction. The extent of packing the soil samples by the laboratory method is accurately controlled as well as the moisture in the samples at the time of packing. The samples are cured uniformly and tested with a capillary rise test which gives information as to the tendency of the soil to pick up water from a wet sub-grade. These capillary rise tests are run for only 24 hours since the dominant portion of the moisture pickup occurs during this period. The allowable moisture pickup is that required to bring the sample to ¾ optimum moisture which is based on the principle that if the soil does not increase in moisture content over ¾ optimum under adverse moisture conditions, it will give adequate bearing capacity, and suitable capillary resistance.

The laboratory method utilizes a sand tamper such as is the standard in the foundary industry. A quantity of soil is tamped in a cylindrical mold to form a cylinder of soil 2 inches in diameter and slightly over 1½ inches high. This mold is constructed so that instead of having a firm bottom, it rides on a false bottom which in its movement contributes packing on the bottom of the sample while the top is being tamped. After 10 tamps are delivered to the top of the sample, the mold is reversed and the bottom of the sample is also given 10 tamps, thereby providing a uniformity of packing not otherwise achieved. By means of a registering plunger, the sample is then moved in the mold so that any excess over the 1½ inch height projects above the top of the mold and can be struck off. This is done for the purpose of obtaining a series of samples exactly 1½ inches high. Work with this equipment has established that it is preferable to tamp samples containing resinous material at about 90% of optimum moisture as determined by standard equipment (see A. S. T. M. designation: D558–40T). With tamping at this slightly low moisture content, there would be a tendency for the sample to show slightly lower density than that obtainable at optimum moisture. To obtain specimens having a density equivalent to maximum density, an extra weight is placed on the standard foundry sand rammer to increase the tamping force.

After a series of samples with varying amounts of resinous material is prepared, they are allowed to dry back to 60% of optimum moisture in a pan over water. After the samples have gone through this curing and drying period, they are placed in ¼ inch of water for a period of 24 hours in a pan with a tight lid and are then reweighed to determine the moisture pickup. These figures are reported alongside a figure of the amount of moisture which that particular sample will have to pick up to reach ¾ of optimum moisture. If the figure of moisture pickup is less than that required to bring the sample to ¾ optimum moisture, sufficient resinous material is considered to be present for field proportioning and construction.

The same soil as used in Example I was made into specimens 2 inches in diameter and 1½ inches high in accordance with the laboratory procedure outlined above and using different quantities of resinous materials. These results are shown in Table II following:

of the initial coal tar hydrocarbon extract may be treated with a mixture of a petroleum hydrocarbon, as gasoline, and furfural and the two layers which form separated, in which case the petroleum hydrocarbon-insoluble pine wood resin is found dissolved in the furfural from which it may be obtained by evaporation of the furfural. Other methods of isolating the desired petroleum hydrocarbon-insoluble pine wood resin may be employed, if desired, such as with use of other solvents for extracting the total resin content from the wood. The resin may be defoamed by steaming or heat treated to remove volatile substances.

This resinous material is characterized by a dark red-brown color, cherry red in solution, and by substantial insolubility in petroleum hydrocarbons; but it will vary somewhat in its specific characteristics such as acid number, melting point, exact petroleum ether solubility, non-carboxylic hydroxyl content and iodine number, depending on the details of the extraction process utilized. The resin will meet or nearly meet the following specifications; namely, substantial insolubility in petroleum hydrocar-

TABLE II

*Capillary Rise Test*

[Type soil A-3; optimum moisture 5.0%; density 105 lbs./cu. ft.]

| Indent. No. | Method of treatment | Resin/sq. yd. 6″ depth | Moisture at compaction | Moisture when placed in ¼″ H₂O | Moisture content after 2 hrs. | Moisture content after 24 hrs. | Moisture pickup in 24 hrs. | Moisture pickup to give ¾ optimum | Remarks |
|---|---|---|---|---|---|---|---|---|---|
| 1 | Pine wood resin slurry | *Pounds* 3 | 4.6 | 2.8 | 3.1 | 4.1 | 1.3 | 1.2 | Wet to top, some slaking at bottom. |
| 2 | ---do--- | 4 | 4.6 | 2.8 | 3.1 | 3.5 | 0.7 | 1.2 | Do. |
| 3 | ---do--- | 5 | 5.5 | 2.8 | --- | 3.9 | 1.1 | 1.2 | Wet ¾ to top. No apparent slaking. |
| 4 | Pine wood resin-rosin emulsion. | 5 | 4.6 | 2.8 | 2.8 | 2.8 | 0.0 | 1.2 | No water, pickup firm. |
| 5 | ---do--- | 7.5 | 3.7 | 2.2 | 2.2 | 2.2 | 0.0 | 1.8 | Do. |
| 6 | ---do--- | 10 | 3.7 | 1.8 | 1.8 | 1.8 | 0.0 | 2.2 | Do. |

It is evident by referring to Table II that the various materials used all had good capillary rise resistance.

It is further evident from the above examples that the method of road or paving construction as practiced in accordance with the present invention affords a method whereby roads and pavements can be constructed with an expediency heretofore unknown and with an assurance that the construction will be properly bonded, regardless of precipitation conditions.

The pine wood resin used in the above examples is a substantially petroleum hydrocarbon insoluble pine wood resin which may be prepared from pine wood, preferably from stump pine wood and which comprises the resinous residue remaining after separation of the rosin from the total resinous extract of the wood. Thus, the pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the petroleum hydrocarbon-insoluble resin. Extraction of this mixture with a petroleum hydrocarbon such as, for example, gasoline, dissolves and removes the rosin. After separation of the rosin, high in abietic acid, a resinous residue remains which is low in abietic acid and which is substantially insoluble in petroleum hydrocarbons. Alternatively, the residue bons, substantially complete solubility in alcohol, a methoxy content of from about 3 percent to about 7 percent (usually from about 4 percent to about 6 percent), an acid number in the range from about 80 to about 110, a drop melting point from about 95° C. to about 125° C., and a non-carboxylic hydroxyl content of about 5 to about 9 percent.

The aqueous slurry of the above defined pine wood resin may be prepared by mixing said resin with a small amount of dilute aqueous solution of an alkali to saponify a minor proportion of the resin, thereby forming a suspension.

The emulsion referred to as a pine wood resin-rosin mixture may be prepared by fluxing together the above described pine wood resin and a resin having a lower melting point to give a resinous mixture fluid enough to be agitated at 110° C. or less; then partially neutralizing the fluxed mixture with ammonium hydroxide to give a thick paste; then diluting the ammonium-resin soap paste thus formed with water in the presence of a protective colloid such as casein. A resin-rosin ratio in the order of 1 to 1 has been found to give excellent results in practicing the invention, however, other resin-rosin ratios may be employed, the upper limit being in the order of 1 to 2.

The principal uses of the present invention are in connection with roads, runways, walks, ground slabs, playgrounds or other type paving construction.

The method of constructing roads and pavements in accordance with this invention provides an economical and expedient method for such constructions as well as a superior type of construction from the standpoint of resistance to surface and sub-surface water action and improved bond between the soil particles of the grade. However, the principal advantage of this method of road construction resides in the ability of the construction to withstand precipitation during the construction operation before the bituminous binder is added. The benefits derived from such a construction cannot be over-emphasized, particularly in connection with military operations where the essence of time is of paramount importance in the construction of durable roads and runways.

What I claim and desire to protect by Letters Patent is:

1. As a construction expedient in the art of building roads and the like, wherein a bituminous material is incorporated as a binder for unstable soil, the step which comprises treating the soil, prior to incorporation of said bituminous material, with a pine wood resin in a minor proportion sufficient to inhibit the deleterious effects of precipitation and capillarity.

2. As a construction expedient in the art of building roads and the like, wherein a bituminous material is incorporated as a binder for unstable soil, the step which comprises treating the soil, prior to incorporation of said bituminous material, with an aqueous slurry of a pine wood resin in a minor proportion sufficient to inhibit the deleterious effects of precipitation and capillarity.

3. As a construction expedient in the art of building roads and the like, wherein a bituminous material is incorporated as a binder for unstable soil, the step which comprises treating the soil, prior to incorporation of said bituminous material, with an aqueous dispersion of a pine wood resin-rosin mixture in a minor proportion sufficient to inhibit the deleterious effects of precipitation and capillarity.

4. As a construction expedient in the art of building roads and the like, wherein a bituminous material is incorporated as a binder for unstable soil, the step which comprises mixing with the soil, prior to incorporation of said bituminous binder, between about 0.3 to about 3% of a pulverized pine wood resin to inhibit the deleterious effects of precipitation and capillarity.

5. As a construction expedient in the art of building roads and the like, wherein a bituminous material is incorporated as a binder for unstable soil, the step which comprises treating the soil, prior to incorporation of said bituminous binder, with an aqueous slurry of a pine wood resin in a minor proportion sufficient to inhibit the deleterious effects of precipitation and capillarity, said proportion being in the order of 1.5 to 3.0 pounds of solids per square yard.

6. As a construction expedient in the art of building roads and the like, wherein a bituminous material is incorporated as a binder for unstable soil, the step which comprises treating the soil, prior to incorporation of said bituminous binder, with an aqueous dispersion of a pine wood resin-rosin mixture in a minor proportion sufficient to inhibit the deleterious effects of precipitation and capillarity, said proportion being in the order of 1.5 to 3.0 pounds of solids per square yard.

JOHN H. LONG.